Oct. 11, 1932. E. TIMBS ET AL Re. 18,620

SAFETY THROW-OFF IRON

Original Filed July 24, 1928 2 Sheets-Sheet 1

Inventors

Edward Timbs

Lester E. Peck

By Lyon & Lyon

Attorneys

Oct. 11, 1932. E. TIMBS ET AL Re. 18,620

SAFETY THROW-OFF IRON

Original Filed July 24, 1928 2 Sheets-Sheet 2

Inventors

Edward Timbs

Lester E. Peck

By Lyon & Lyon

Attorneys

Reissued Oct. 11, 1932

Re. 18,620

UNITED STATES PATENT OFFICE

EDWARD TIMBS AND LESTER E. PECK, OF LOS ANGELES, CALIFORNIA, ASSIGNORS TO THE NATIONAL SUPPLY COMPANY, OF TOLEDO, OHIO, A CORPORATION OF OHIO

SAFETY THROW-OFF IRON

Original No. 1,800,367, dated April 14, 1931, Serial No. 295,016, filed July 24, 1928. Application for reissue filed February 17, 1932. Serial No. 593,644.

This invention relates to safety throw-off irons, and is more particularly related to a safety connecting device that may be easily and safely manipulated between a central power pumping eccentric and the pull rod leading to each pumping well.

Heretofore it has been common practice to connect the pull rods, which connect with and drive the pump mechanism of wells, particularly oil wells, with a central source of power so that a plurality of well pumping mechanisms may be driven from a central power plant.

Many times during the operation of such a combination it becomes necessary to disconnect the pull rod of a single well pump to repair, replace or renew some part of the pumping mechanism connected thereto or driven thereby.

An object of this invention is to provide a connecting means between a centrally located power device and the pumping mechanism of each well that may be manipulated to effect a connection between the central power device and any well pumping mechanism, or to effect a disconnection there-between without necessitating the stopping of the central power device, and which connecting means, herein termed a "throw-off iron," may be manipulated easily and with entire safety to the operator.

Other objects of this invention include the provision of a safety throw-off iron which is of simple, but still effective construction, which includes a minimum of working parts and is adaptable for installation under substantially all working conditions.

Other objects and advantages of this invention it is believed will be apparent from the following detailed description of a preferred embodiment thereof as illustrated in the accompanying drawings.

Figure 1:
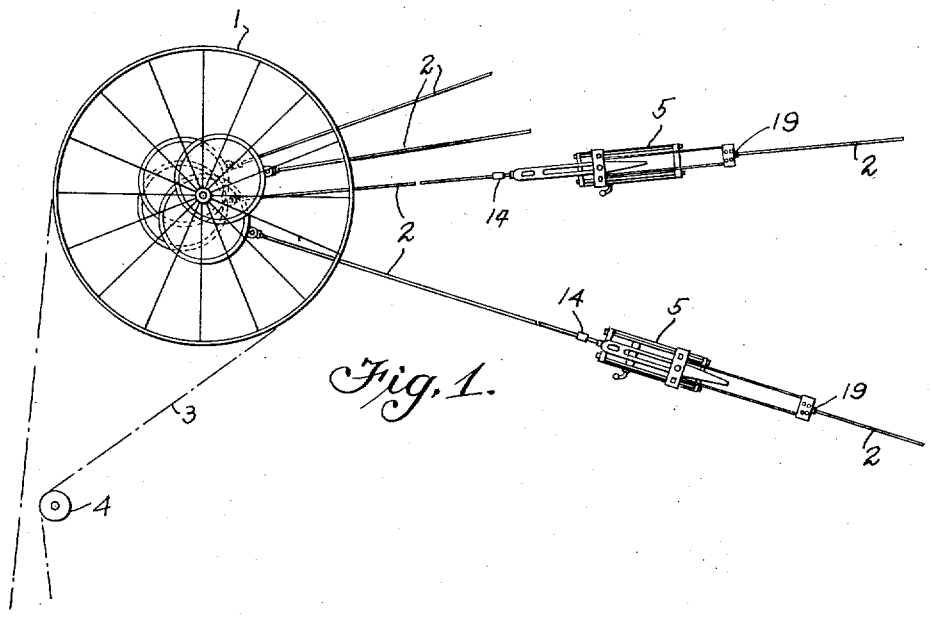
Figure 1 is a plan diagrammatic view of a pumping installation and illustrating safety throw-off irons embodying this invention as adapted therein.
Figure 2:
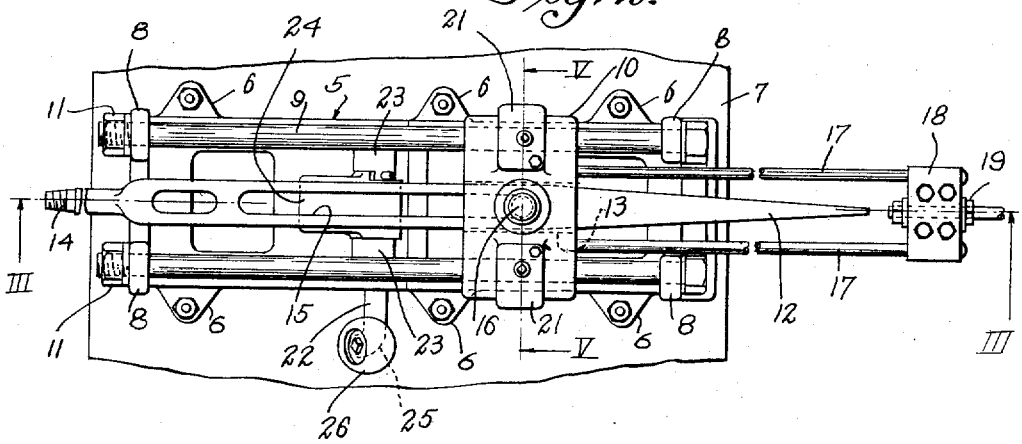
Figure 2 is an enlarged top plan view of a safety throw-off iron embodying this invention illustrating the same in connected or latched position.
Figure 3:
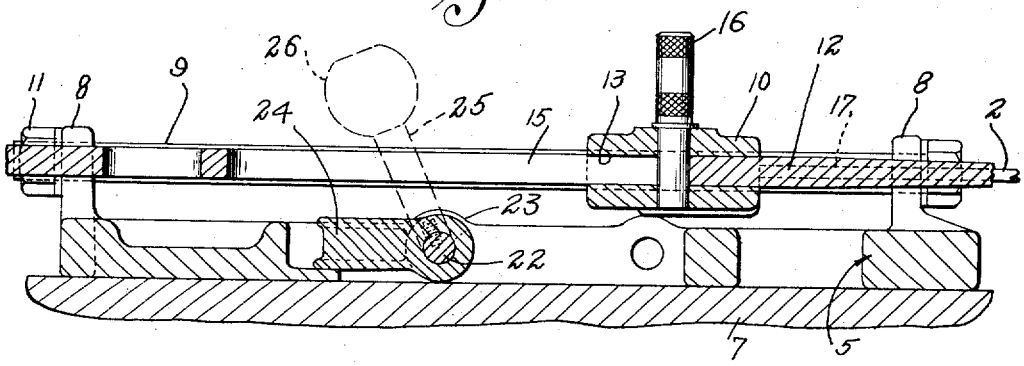
Figure 3 is a sectional side elevation thereof taken substantially on the line 3—3 of Figure 2 and illustrating the throw-off iron in position when the connection between the well pull rods and the central power plant is in actuating condition.
Figure 4:
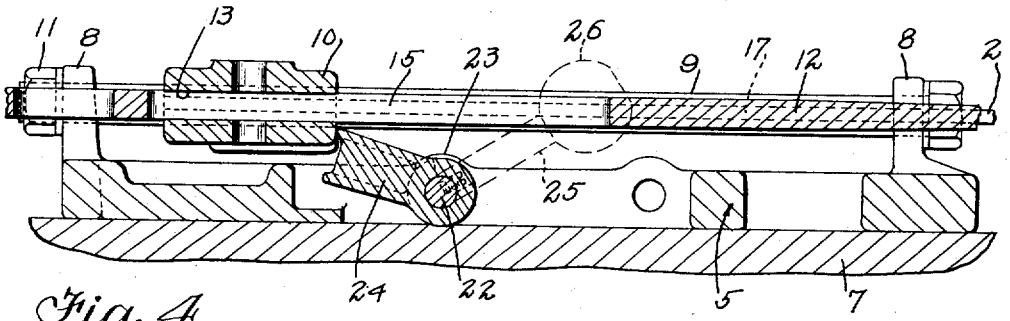
Figure 4 is a view similar to Figure 3 illustrating the throw-off iron as actuated to break the connection between the well pull rods and the central power plant.
Figure 5:
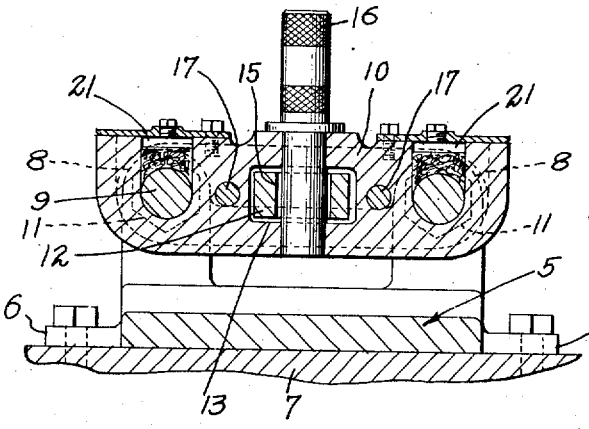
Figure 5 is a sectional end elevation taken substantially on the line 5—5 of Figure 2.

In the preferred embodiment of this invention illustrated in the accompanying drawings, 1 indicates a centrally located drive wheel which forms an eccentric for driving the pumping mechanism (not shown) of a plurality of wells through connecting rods 2.

The wheel 1 is driven in any suitable or desirable manner such, for example, as by the belt 3 connected through a belt tightener 4 with a prime mover (not shown). Connected in the connecting rods 2 in a manner to permit the pumping mechanism of any well to be rendered inoperative or to be disconnected from its driving mechanism, is a safety throw-off iron embodying this invention, which is preferably of the following construction:

A base casting 5 is bolted through the ears 6 to a foundation block 7. Secured to the base casting 5 through ears 8 are guide rods 9. The guide rods 9 are spaced apart and extend parallel to the direction of extension of the connecting rod 2 and provide guide means for a traveling block 10. The traveling block 10 is guided by the rods 9 extending through longitudinally extending bores formed through the block 10. In order to permit the device to be assembled easily, the rods 9 are provided with nuts 11 at their opposite ends.

A slide 12 extends through a guide-way 13 formed axially of the block 10 and is secured by means of a coupling 14 to the portion of the connecting rod 2 which extends to the eccentric wheel 1.

The slide 12 is slotted longitudinally of its length as indicated at 15. When the device is normally operating, the slide 12 is in an extended relation to the block 10 with the latch pin 16 engaged against the end face of the slot 15 remote from the coupling end 14. The stroking action of the pumping power is thus transmitted to traveling block 10.

Secured to the block 10 are rods 17 which are connected to a cross-head 18. The cross-head 18 is connected at 19 with the opposite end of the connecting rod 2 or the end of the connecting rod which extends to and is connected with the pumping jack or pumping mechanism of the oil well. The slot 15 in the slide 12 is provided for two purposes. In case the pump rods should break or become disconnected, there will be no force acting to move the traveling block 10, together with its rods 17, cross-head 18 and connecting rods 2, to the right, as viewed in Figure 1, on what would ordinarily be the gravity downstroke of the well pump. Therefore, at the end of the first up stroke after the pump rods are parted, the traveling block 10 will remain at the end of the base 5 adjacent to the pumping power 1, and upon the next movement of the slide 12 to the right, the slot 15 will permit complete stroking of the slide 12 with the pin 16 in a stationary position. Without the slot 15, the connecting rods 2 connected to the cross-head 18 would be dragged back and forth over the ground upon each stroke of the pumping power 1.

In order to lubricate the guide rods 9 as the block 10 travels along the same when the latch pin 16 is down in locking position, lubricating reservoirs 21 are formed in the opposite sides of the block 10 and are adapted to receive waste or a like material and a lubricating oil or grease so that the lubricant will drain from the reservoirs 21 and on to the guide rods 9.

In order to permit the block 10 to be held in position so that the same may be readily connected with the slide 12 after the latch pin 16 has been lifted to disconnect the block 10 from the slide 12, latch means are provided for holding the block 10 in position to permit the pin 16 to pass into the slot 15 of the slide 12 without necessitating the operator manually pulling the block 10 to the correct position to effect the connection, which is a dangerous operation, particularly in that it would necessitate the holding of the block 10 in a definite position and also a manipulation of the latch pin 16 at the same time. The slot 15 permits the ready insertion of the pin 16 without requiring the operator to precisely time the stroking of the slide 12. The latch means includes a latch rod 22 which is journaled in the bosses 23 formed on the opposite sides of the base casting 5 and which latch rod 22 is provided with a latch bar 24 which is adapted to be rotated up into position to engage the end of the block 10 and hold the block 10 in position to permit the latch pin 16 to be dropped into the slot 15 when the slide 12 has been reciprocated to the proper position by the eccentric wheel 1. The latch rod 22 is bent as illustrated at 25 and is provided with a weighted ball 26 on its end to normally hold the latch bar 24 out of position from engagement with the block 10.

When it is desired to release the connection between the separate portions of the connecting rod 2, the operator will raise the latch bar 24 into position to engage the block 10 on reciprocation of the block 10 from the eccentric wheel 1 and will, on engagement of the latch bar 24 with the block 10, lift the latch pin 16 out of latching position, thereby releasing the slide 12 from engagement with the block 10. The latch bar 24 then holds the pumping mechanism which is connected with the portion of the connecting rod 2 which extends to the pumping mechanism in position to permit the ready connection with the reciprocating slide 12.

With the traveling block 10 secured in a stationary position by the latch bar 24, the free end of the slide 12 reciprocates between the two parallel rods 17, and due to the slight lateral oscillatory motion imparted to the slide 12 by the motion of the power eccentric, it is necessary to taper the free end of the slide 12 in order to clear the rods 17.

Having fully described our invention, it is to be understood that we do not wish to be limited to the details herein set forth, but our invention is of the full scope of the appended claims.

We claim:

1. Coupling means for power transmission for oil well pumps comprising a bed plate, two parallel guide bars suitably secured to said bed plate, a cross-head slidably mounted on said guide bars and having a guide way formed axially with said cross-head, a slide slidably mounted in said cross-head guide way and having a recess at one end thereof, a latch pin arranged to pass through said cross-head and to enter said slide recess, locking means comprising a latch rod suitably journaled in said bed plate, a latch bar suitably secured to said latch rod and a weighted actuating lever.

2. A safety throw-off iron coupling means for power transmission for oil well pumps comprising a base casting, parallel guide bars suitably mounted on said base casting, a block slidably mounted on said guide bars, said block having a guide way formed axial thereof and provided with connecting means for the pumping mechanism, a slide slidably mounted in said block guide way and having a recess at one end and provided with connecting means for the power drive, a removable latch pin arranged when in operative position to operatively connect said block and said slide, locking means arranged when actuated to engage said block and comprising a latch rod suitably journaled in said base casting, a latch bar suitably secured to said latch rod and a weighted actuating lever.

3. A safety throw-off iron coupling means for power transmission for oil well pumps comprising a base casting, guide bars suitably mounted on said base casting, a block slidably mounted on said guide bars and having a guide way formed axial with said block and pumping mechanism connecting means, a slide slidably mounted in said block guide way and having a recess at one end and a power drive connecting means, a removable latch pin arranged when in position to operatively connect said block and said slide, locking means arranged when actuated to engage said block and comprising a latch rod journaled to said base casting, a latch bar secured to said latch rod and a weighted actuating lever, whereby said power transmission can be safely connected or disconnected while the power drive is operating.

4. In a device of the kind described, the combination of a bed plate, a block guided to slide on the bed plate, a slide with means for connecting the same to a power mechanism, a pin and slot connection between the block and the slide, means for connecting the block to the pump rod, and a latch bar pivotally mounted on the base casting and capable of being moved into the path of the block to arrest the movement of the same in its travel in the direction of the pump.

5. In a device of the kind described, the combination of a bed plate, a block guided to slide on the bed plate, a slide with means for connecting the same to a power mechanism, a pin and slot connection between the block and the slide, means for connecting the block to the pump rod, and a latch bar pivotally mounted on the base casting and capable of being moved into the path of the block to arrest the movement of the same in its travel in the direction of the pump, and a weighted lever connected with the latch bar for holding the same in the path of the block or in a depressed position out of the path of the block.

6. In a device of the kind described, the combination of a bed plate, a block guided to slide on said plate, a slide with means for connecting the same to a power mechanism, a pin and a slot connection between the block and the slide, means for connecting the block with pump rods so that the weight imposed on said block normally holds the block and slide in extended relation and so that when the pump rods part said block may remain stationary with said pin reciprocating in said slot.

Signed at Los Angeles, California, this 12th day of January, 1932.

EDWARD TIMBS.
LESTER E. PECK.